(12) United States Patent
Elling

(10) Patent No.: US 12,127,530 B2
(45) Date of Patent: Oct. 29, 2024

(54) MANURE COLLECTING DEVICE, STABLE CLEANING DEVICE AND METHOD

(71) Applicant: Joz B.V., Westwoud (NL)

(72) Inventor: Rob Elling, Hoogkarspel (NL)

(73) Assignee: Joz B.V., Westwoud (NL)

( * ) Notice: Subject to any disclaimer, the term of this patent is extended or adjusted under 35 U.S.C. 154(b) by 106 days.

(21) Appl. No.: 17/800,709

(22) PCT Filed: Feb. 17, 2021

(86) PCT No.: PCT/NL2021/050102
§ 371 (c)(1),
(2) Date: Aug. 18, 2022

(87) PCT Pub. No.: WO2021/172980
PCT Pub. Date: Sep. 2, 2021

(65) Prior Publication Data
US 2023/0082776 A1    Mar. 16, 2023

(30) Foreign Application Priority Data

Feb. 25, 2020 (NL) ...................................... 2024993

(51) Int. Cl.
*A01K 1/01* (2006.01)
(52) U.S. Cl.
CPC .................................. *A01K 1/0128* (2013.01)
(58) Field of Classification Search
CPC .................................................. A01K 1/0128

(Continued)

(56) References Cited

U.S. PATENT DOCUMENTS 5,341,540 A * 8/1994 Soupert .................... B25J 5/007
180/169
6,327,741 B1 * 12/2001 Reed ...................... A47L 9/2852
15/340.1

(Continued)

FOREIGN PATENT DOCUMENTS

| CN | 105993971 A | 10/2016 |
| CN | 209845922 U | 12/2019 |
| WO | WO-2017150967 A1 * | 9/2017 ............. A01K 1/015 |

*Primary Examiner* — Monica L Perry
*Assistant Examiner* — Brittany A Lowery
(74) *Attorney, Agent, or Firm* — Bret E. Field; Bozicevic, Field & Francis LLP

(57) ABSTRACT

Manure collecting device, comprising a manure pick-up device for picking up manure from a floor of an animal accommodation, and a reservoir for collecting therein manure picked up by the manure pick-up device, wherein the manure pick-up device comprises a housing, comprising a receiving opening to be arranged close to the floor for the purpose of receiving manure in the housing therethrough, a delivery opening arranged close to the reservoir for the purpose of delivering the picked-up manure to the reservoir therethrough, and an at least partially cylindrical inner wall, wherein the inner wall extends at least between the receiving opening and the delivery opening, and a rotatably movable body with a central shaft and at least one arm extending radially relative to the shaft between the shaft and the inner wall, wherein the manure pick-up device is configured such that, while the body moves in rotating manner, the manure is picked up close to the receiving opening by means of the arm and is transported through the housing to the reservoir in co-action with the inner wall.

11 Claims, 5 Drawing Sheets

(58) Field of Classification Search
USPC .......................................................... 119/451
See application file for complete search history.

(56) References Cited

U.S. PATENT DOCUMENTS

| | | | |
|---|---|---|---|
| 2006/0249092 A1* | 11/2006 | Waybright | A01K 1/0132 119/451 |
| 2008/0173247 A1 | 7/2008 | Mainini | |
| 2012/0055508 A1* | 3/2012 | Van Den Berg | A01K 1/105 134/6 |
| 2015/0245587 A1* | 9/2015 | Van Den Berg | A01K 1/0128 15/93.1 |
| 2018/0310519 A1* | 11/2018 | Van Den Beukel | A01K 1/0132 |

* cited by examiner

MANURE COLLECTING DEVICE, STABLE CLEANING DEVICE AND METHOD

The present invention relates to a manure collecting device. The invention relates particularly to a manure collecting device comprising a manure pick-up device for picking up manure from a floor of an animal accommodation and a reservoir for collecting therein manure picked up by the manure pick-up device. The present invention further relates to an animal accommodation cleaning device, comprising an advancing device for advancing the animal accommodation cleaning device through the animal accommodation in a direction of movement. Finally, the present invention relates to a method for cleaning a floor of an animal accommodation.

Animal accommodation cleaning devices are per se known. For instance known from the Netherlands patent publication no. 2019959 in the name of Lely Patent B.V. is an animal accommodation cleaning vehicle for removing manure from an accommodation floor in an accommodation for livestock. This accommodation cleaning vehicle particularly comprises a manure scraper for displacing manure over the accommodation floor and a manure suction device for sucking up manure gathered by the manure scraper, and a manure storage container connected to the manure suction device for the purpose of catching and temporarily storing the sucked-up manure. A drawback of this accommodation cleaning vehicle is that not all manure compositions, i.e. compositions consisting of solid or liquid manure or mixtures thereof, can be sucked up with the manure suction device. This results in manure remaining on the accommodation floor. This causes the feet of the livestock present in the accommodation to become soiled, and the manure that was not sucked up emits ammonia, which has an adverse effect on both the livestock's health and on the environment. A further drawback is that creating a vacuum for the functioning of the manure suction device requires a lot of energy, which is generally in short supply, particularly in wireless mobile accommodation cleaning devices.

It is therefore an object of the present invention to provide an energy-efficient animal accommodation cleaning device which improves the health of the livestock present in the animal accommodation.

According to a first aspect thereof, the present invention provides for this purpose a manure collecting device of the type stated in the preamble, with the special feature that the manure pick-up device comprises a housing, comprising a receiving opening to be arranged close to the floor for the purpose of receiving manure in the housing therethrough, a delivery opening arranged close to the reservoir for the purpose of delivering the picked-up manure to the reservoir therethrough, and an at least partially cylindrical inner wall, wherein the inner wall extends at least between the receiving opening and the delivery opening, and a rotatably movable body with a central shaft and at least one arm extending radially relative to the shaft between the shaft and the inner wall, wherein the manure pick-up device is configured such that, while the body moves in rotating manner, the manure is picked up close to the receiving opening by means of the arm and is transported through the housing to the reservoir in co-action with the inner wall. Since the manure pick-up device is formed by a mechanical system of a rotatably movable body and a housing formed correspondingly therewith, the manure collecting device is able to pick up manure in various compositions, i.e. both highly liquid and highly solid manure and mixtures thereof, and collect them in the reservoir. The manure collecting device therefore functions very effectively owing to the mechanical pick-up, so that no manure remains behind on the accommodation floor.

This drastically reduces the ammonia emission by manure present on the floor. It is also achieved that the feet of the animals in the animal accommodation remain dry, which has a positive effect on the health of the animals. The mechanical manure pick-up device is furthermore very energy-efficient, this is in contrast to known manure pick-up devices, which makes the manure pick-up device particularly suitable for use in mobile and wireless animal accommodation cleaning devices, which are for instance provided with an electric battery. In this way the present invention therefore provides an energy-efficient animal accommodation cleaning device which improves the health of the livestock present in the accommodation. The manure collecting device preferably further comprises a drive device which is configured to drive the rotatably movable body, such that the body rotates about its central shaft.

In a preferred embodiment the manure collecting device is configured to be advanced through the animal accommodation in a direction of movement and to pick up manure using the manure pick-up device while the manure collecting device advances through the animal accommodation, wherein the receiving opening is situated on a front side of the manure collecting device, as seen in the direction of movement. In this way it is achieved that the forward movement of the manure collecting device contributes to the picking up of the manure, since the manure moves through the receiving opening into the housing due to forward movement of the manure collecting device.

The central shaft preferably extends perpendicularly of the direction of movement, in a horizontal direction. The delivery opening is more preferably located close to an upper side of the reservoir. In this way manure is transported upward from the receiving opening close to the floor by the arm of the rotatably movable body and delivered to the reservoir on an upper side of the reservoir. A particular advantage hereof is that the reservoir can be filled from an upper side so that picked-up manure is unable to run back from the reservoir to the housing, and at least substantially the full capacity of the reservoir can be utilized.

In a preferred embodiment the manure collecting device further comprises close to the delivery opening a scooping element configured to scoop away at least a part of a quantity of manure which has been picked up by the arm and is transported to the delivery opening on a side of the arm facing toward the delivery opening, and to guide this part through the delivery opening toward the reservoir. The arm and the scooping element are preferably configured such that the whole quantity of manure is scooped from the arm by the scooping element. With such a scooping element it is achieved that manure picked up by the arm of the rotatably movable body and transported upward can be efficiently delivered, on an upper side of a reservoir lying adjacently of the housing, through the delivery opening to the adjacent reservoir. A particular advantage hereof is that the portion of the manure which is picked up by the arm and delivered to the reservoir is increased using the scooping element relative to embodiments without scooping element.

In a preferred embodiment the scooping element is driven by the drive device via a transmission device, such that the scooping element moves pivotally between a position in which the scooping element is situated in a rotation movement area of the arm and a position close to the delivery opening, in which the scooping element is situated outside a rotation movement area of the arm, such that the scooping element scoops away the part of the quantity of manure transported by the arm and transports it to the delivery opening without the scooping element and the arm touching each other. By using a transmission device the manure present on the arm driven by the drive device is transported by movement toward the delivery opening of the scooping element, which is driven by the same drive device, through the delivery opening and to the reservoir at the moment that the arm is situated close to the delivery opening. The scooping element therefore scoops the quantity of manure present on the arm from the arm, while the arm simultaneously continues to rotate uninterruptedly about its central shaft. In other words, the scooping element does not touch the arm of the rotatably movable body; i.e. not before, not during and not after scooping away of the manure present on the arm.

In a preferred embodiment at least an outer end of the arm is elastically deformable.

In a further preferred embodiment the outer end of the arm is formed by a plate element manufactured from plastic.

In a preferred embodiment the arm has a length greater than a distance between the central shaft and the inner wall and/or a distance between the central shaft and the floor, such that the outer end of the arm drags over the floor and/or along the inner wall while the body moves in rotating manner A particular advantage hereof is that the arm makes contact with the inner wall and therefore connects very closely to the inner wall, as a result of which no manure is able to run off between the arm and the inner wall during upward transport of the picked-up manure. This therefore makes it possible also to pick up very liquid manure and transport it to the reservoir in efficient manner.

In a preferred embodiment the scooping element comprises a static element extending in a rotation movement area of the arm. In combination with an arm which is elastically deformable at its outer end, a movement which is as it were a scooping movement toward the reservoir can be achieved in this way simply by scraping the arm of the rotatably movable body along the scooping element. In other words, the movement of the arm of the rotatably movable body against the scooping element arranged statically in the rotation movement area of the arm brings about a deflection of the direction of movement of the picked-up manure toward the delivery opening and the reservoir.

In a preferred embodiment the at least one arm comprises three arms arranged at mutually equal angles. In this way the manure pick-up device can pick up manure uninterruptedly, i.e. without skipping parts of the accommodation floor, while it performs a single cleaning path through the accommodation.

In a preferred embodiment the manure collecting device further comprises at a transition between the receiving opening and the inner wall a guide element which extends toward the floor tangentially relative to the inner wall and which is configured to guide the manure present on the floor through the receiving opening into the housing while the manure collecting device advances. Such a guide element ensures that substantially all the manure present on the floor enters the housing through the receiving opening and can therefore be picked up by the arm of the rotatably movable body.

According to a second aspect of the invention, the present invention provides an animal accommodation cleaning device of the type stated in the preamble with the special feature, as seen in the direction of movement, of a manure collecting device according to any one of the above described preferred embodiments arranged substantially on a front side of the animal accommodation cleaning device.

A particular advantage of such an accommodation cleaning device is that it is able to pick up manure in various compositions, i.e. both very liquid and very solid manure and mixtures thereof, and collect it in the reservoir. Owing to the mechanical pick-up, the manure collecting device therefore functions very effectively so that no manure remains behind on the accommodation floor. This drastically reduces the ammonia emission by manure present on the floor. It is also achieved that the feet of the animals in the animal accommodation remain dry, which has a positive effect on the health of the animals. The mechanical manure pick-up device is furthermore very energy-efficient, this is in contrast to known manure pick-up devices, which makes the manure pick-up device particularly suitable for use in mobile and wireless accommodation cleaning devices, which are for instance provided with an electric battery. In this way the present invention therefore provides an energy-efficient animal accommodation cleaning device which improves the health of the livestock present in the accommodation.

In a preferred embodiment the advancing device comprises an unmanned vehicle, preferably an autonomously moving vehicle.

According to a third aspect of the invention, the present invention provides a method for cleaning a floor of an animal accommodation, with the special feature that use can be made of a manure collecting device according to any one of the above described preferred embodiments or an animal accommodation cleaning device according to any one of the above described preferred embodiments.

The present invention will be further elucidated with reference to the following figures, which show preferred embodiments of the manure collecting device, the animal accommodation cleaning device and the method according to the invention, and are not intended to limit the scope of protection of the invention in any way, wherein.

Figure 1:
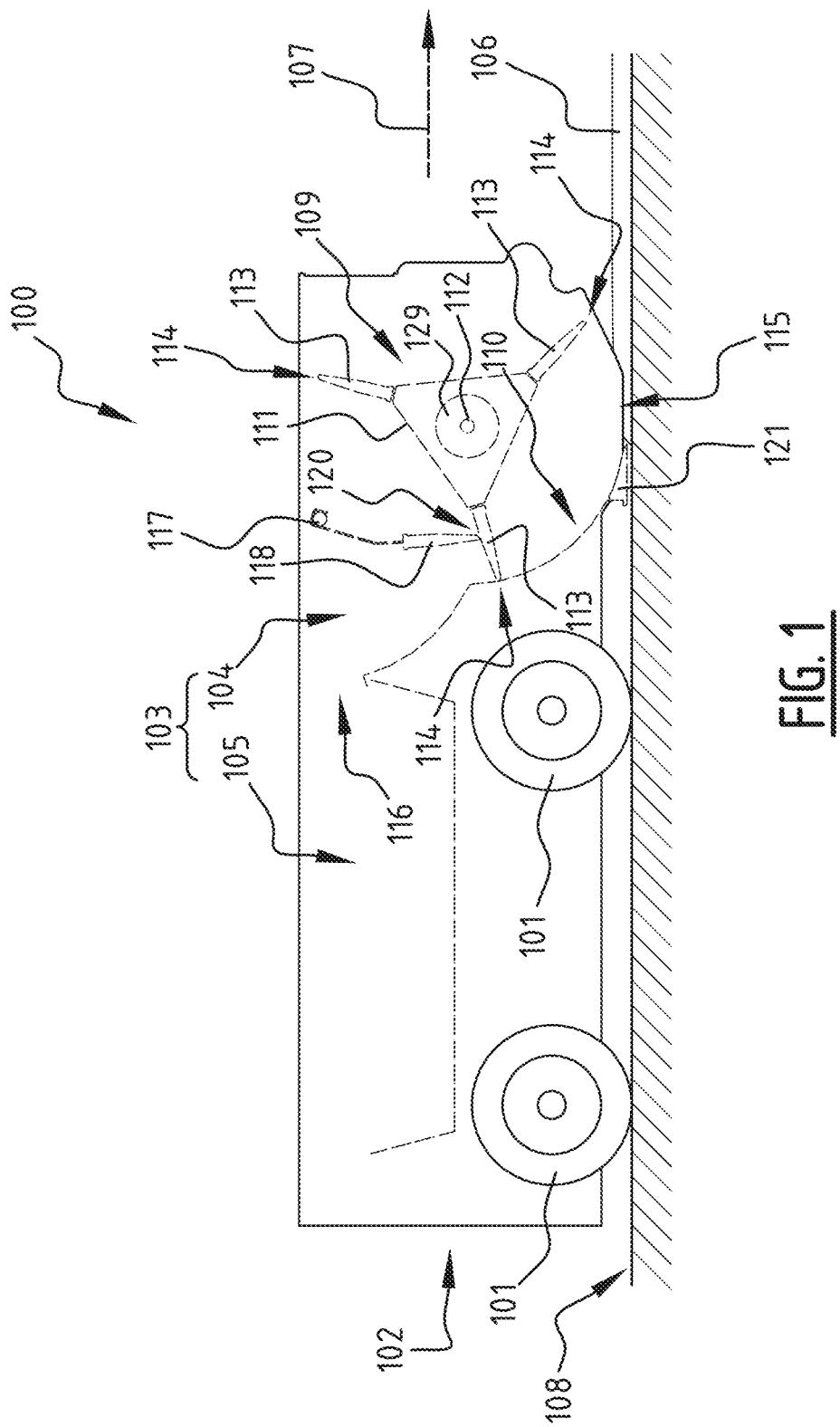
FIG. 1 shows a side view of a preferred embodiment of the animal accommodation cleaning device according to the present invention.

A preferred embodiment of an animal accommodation cleaning device 100 according to the invention is shown in side view in FIG. 1. Accommodation cleaning device 100 is formed by an unmanned vehicle consisting of an advancing device 102 provided with a plurality of wheels 101 and a manure collecting device 103. Manure collecting device 103 consists of a mechanical manure pick-up device 104, also referred to as mechanical pick-up, and a receptacle 105 which serves as a reservoir for picked-up manure 106. Unmanned vehicle 100 is configured to advance with its wheels 101 in a direction of movement 107 over a floor 108 of for instance a livestock accommodation. The manure pick-up device 104 is situated on the front side of unmanned vehicle 100, as seen in the direction of movement 107. Manure pick-up device 104 consists of a housing 109 with an at least partially cylindrically formed inner wall 110 and a rotatably movable body 111 which is arranged in housing 109 and which rotates about a central rotation shaft 112, and is provided with three rotor arms 113 extending between the central rotation shaft 112 and the inner wall 110 of housing 109. The shape of the cylindrically formed inner wall 110 corresponds with the circular path followed by the outer ends 114 of the rotor arms in their rotation movement about central rotation shaft 112. Provided on the underside of manure pick-up device 104 is a receiving opening 115 for receiving therethrough in housing 109 the manure 106 present on the floor 108 of the accommodation. The rotatably movable body 111 is driven by a drive device 129.

While rotatably movable body 111 moves in rotating manner, the manure 106 introduced into housing 109 through receiving opening 115 is picked up by one of the rotor arms 113 of body 111 and transported upward in the direction of receptacle 105 along the partially cylindrical inner wall 110. As soon as the manure 106 picked up by rotor arm 113 is located close to a delivery opening 116, through which the manure 106 can be delivered to receptacle 105, i.e. the reservoir, a pivot arm 118 which is pivotally movable about a pivot shaft 117 and which functions as a scooping element ensures that the manure 106 present on rotor arm 113 is scooped from rotor arm 113 and is transported toward delivery opening 116 and the reservoir 105 lying therebehind. In order to guide the scooped manure 106 toward reservoir 105 a wall part 119 is provided, which is formed such that it corresponds with the circular path followed by the outer end 120 of pivot arm 118 in its pivoting movement to transport the manure 106 scooped from rotor arm 113 from the rotor arm 113 to the reservoir 105. Pivot arm 118 and wall part 119 together ensure that the manure 106 comes to lie in reservoir 105. As can be seen in FIG. 1, delivery opening 116 is situated close to an upper side of reservoir 105. In this way manure 106 is transported upward from receiving opening 115 close to floor 108 by the rotor arm 113 of rotatably movable body 111, and delivered to reservoir 105 on an upper side of reservoir 105. Reservoir 105 can hereby be filled from its upper side, whereby picked-up manure 106 is unable to run back from reservoir 105 to housing 109, and the full capacity of reservoir 105 can moreover be utilized.

Figure 8:
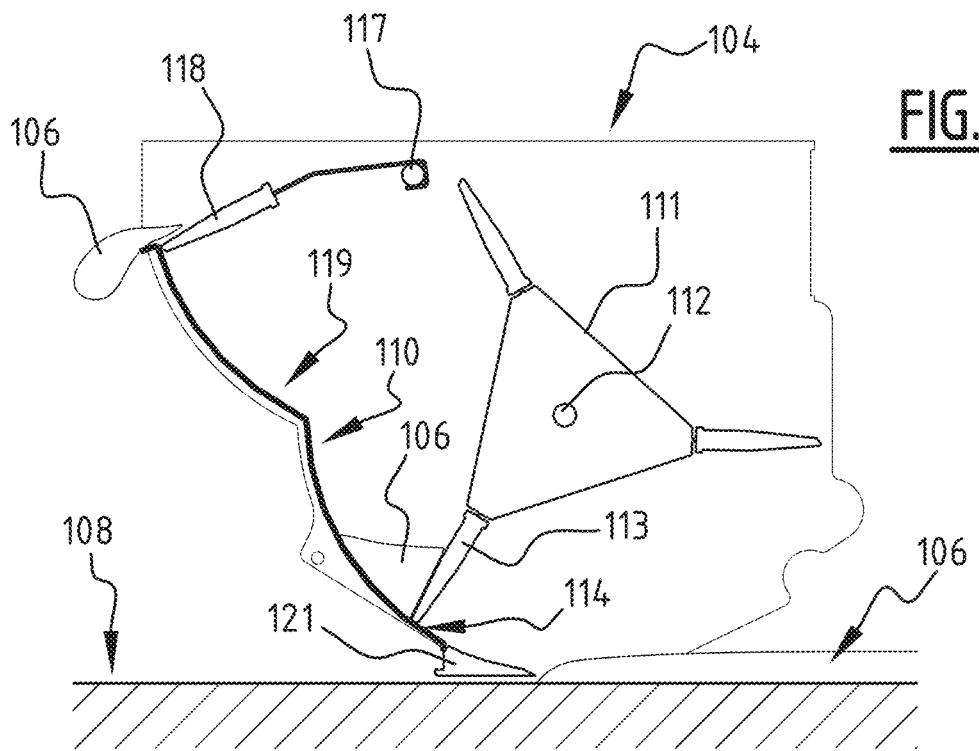
Figure 9:
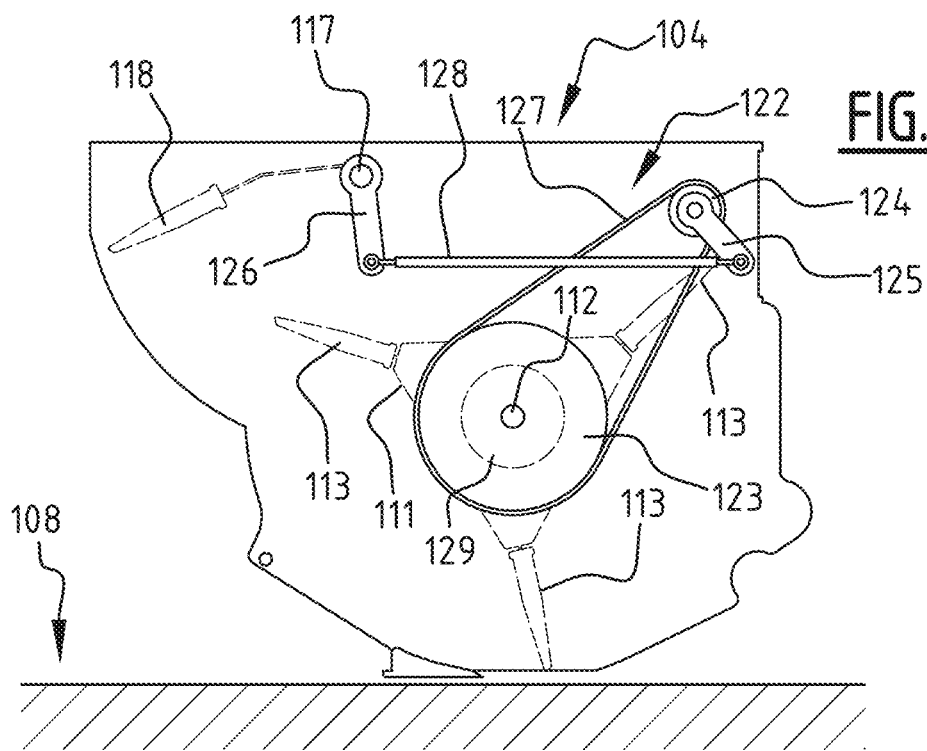

Pivot arm 118, i.e. the pivotally movable scooping element, is driven by the drive device 129 which drives the rotatably movable body 111 via a transmission device 122 (see FIG. 9). By using a transmission device 122 the manure 106 present on the arm 113 driven by the drive device 129 is transported by movement toward delivery opening 116 of the scooping element 118, which is driven by the same drive device 129, through delivery opening 116 and to reservoir 105 at the moment that the arm 113 is situated close to delivery opening 116. For this purpose transmission device 122 comprises a pulley or gear 123 (or the like) which is arranged on the central rotation shaft 112 and on which a belt, chain or toothed belt 127 (or the like) is arranged in order to drive a smaller pulley or gear 124 (or the like). Provided on pulley or gear 124 is a crank 125 to which a drive rod 128 is coupled, by means of which pivot shaft 117 is driven rotatably via a crank 126, such that pivot arm 118, which functions as scooping element, moves pivotally and therefore ensures that the manure 106 present on rotor arm 113 is scooped from rotor arm 113 and is transported toward delivery opening 116 and the reservoir 105 lying therebehind. Scooping element 118 pivots here between a position in which, relative to central rotation shaft 112, the outer end 120 thereof lies on the inside of the quantity of manure 106 picked up by rotor arm 113, and a position in which outer end 120 thereof lies at least on the underside of delivery opening 116 (see also FIG. 5 and FIG. 8, among others). Owing to transmission device 122, scooping element 118 can scoop the quantity of manure 106 present on arm 113 from the arm 113, while arm 113 simultaneously continues to rotate uninterruptedly about its central rotation shaft 112. In other words, scooping element 118 does not touch the arm 113 of rotatably movable body 111; i.e. not before, not during and not after scooping away of the manure 106 present on arm 113.

Situated at the transition between receiving opening 115 and inner wall 110 is a guide element 121 which extends toward the floor 108 tangentially relative to inner wall 110 and which is configured to guide manure 106 present on floor 108 through receiving opening 115 into housing 109 while the accommodation cleaning device 100 advances. Guide element 121 ensures that almost all the manure 106 present on floor 108 enters housing 109 through receiving opening 115 and can therefore be picked up by the arm 113 of rotatably movable body 111.

Figure 2:
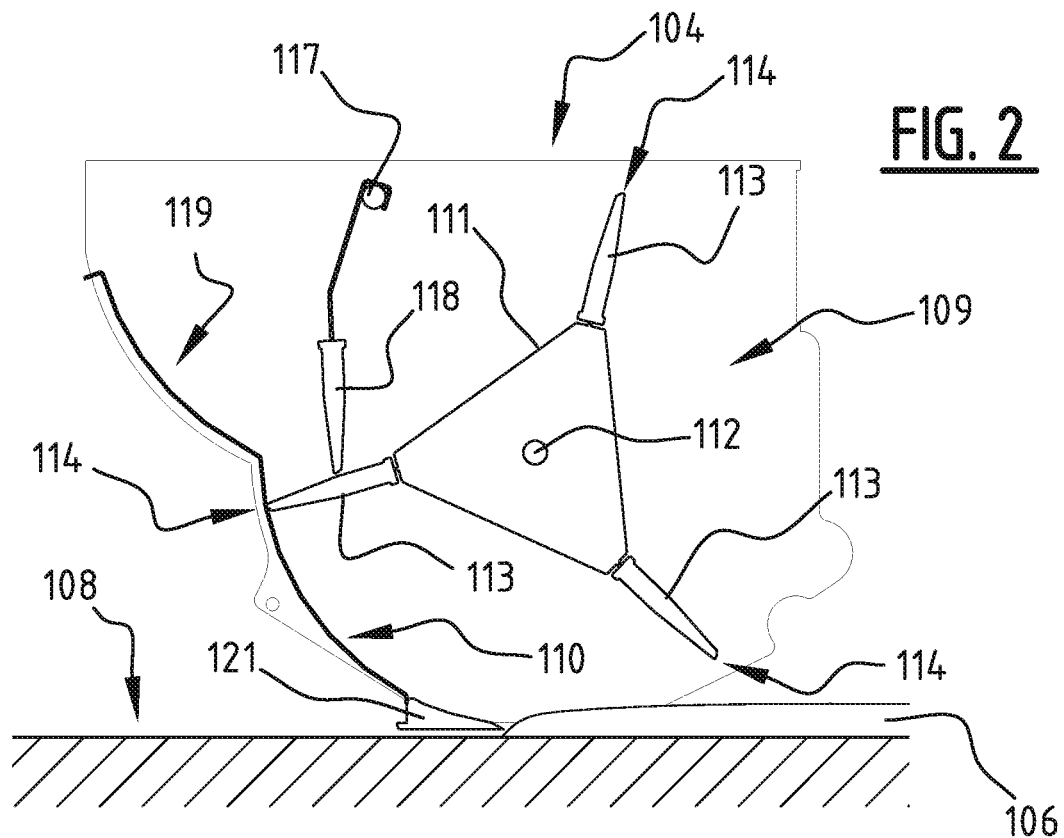
FIGS. 2-9 show a series of side views of the manure pick-up device of a preferred embodiment of the manure collecting device according to the present invention.
Figure 3:
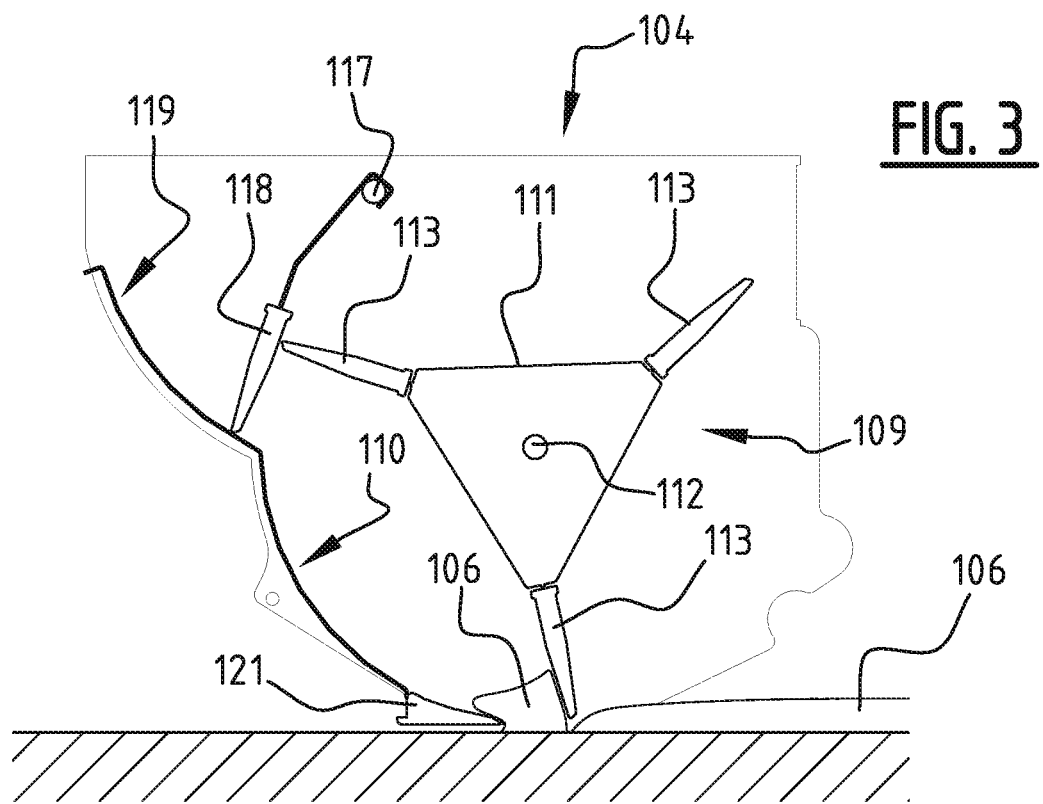
Figure 4:
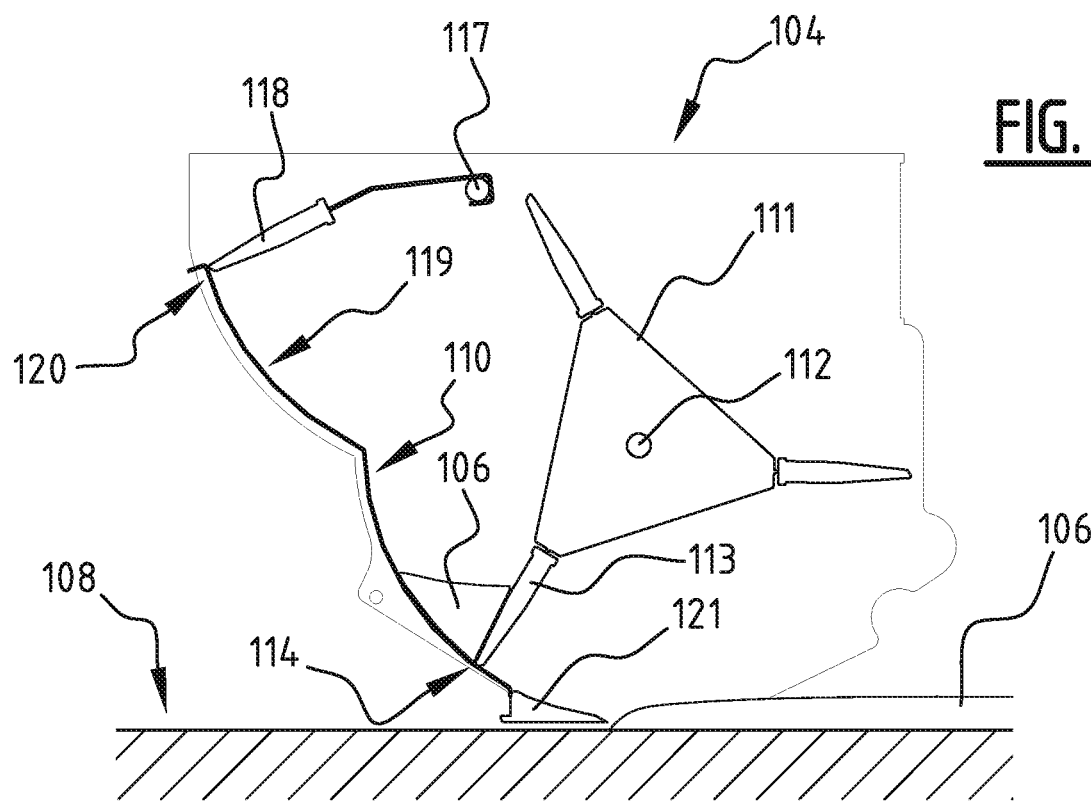
Figure 5:
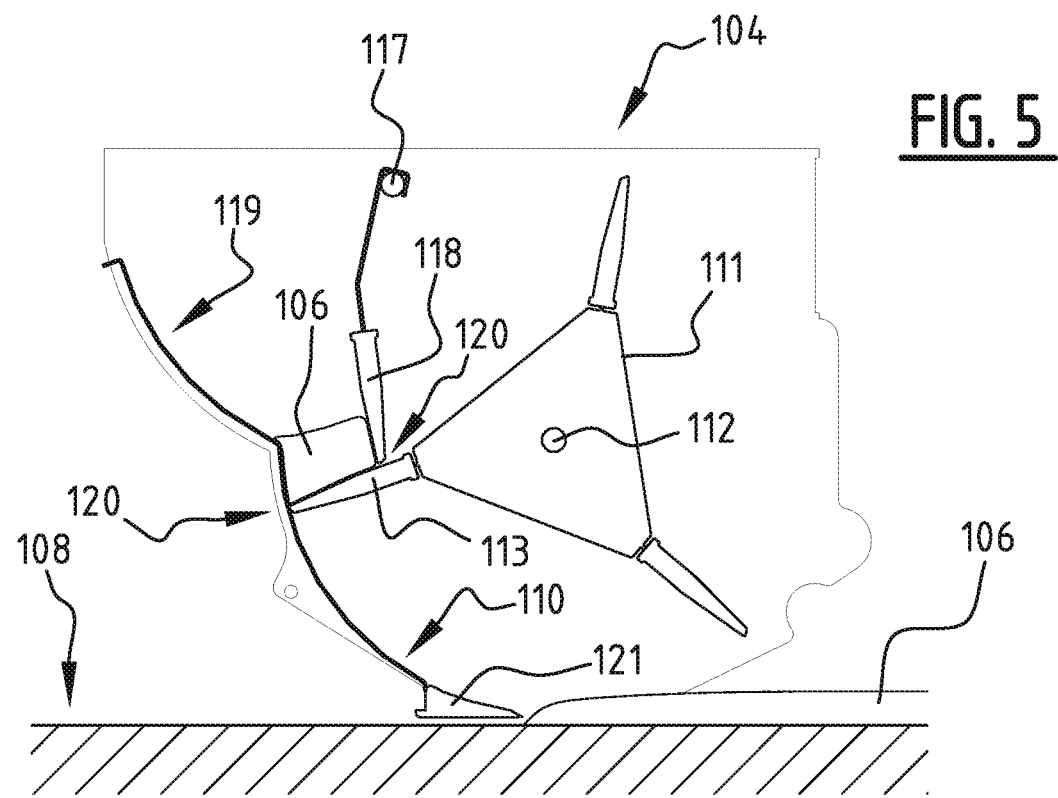
Figure 6:
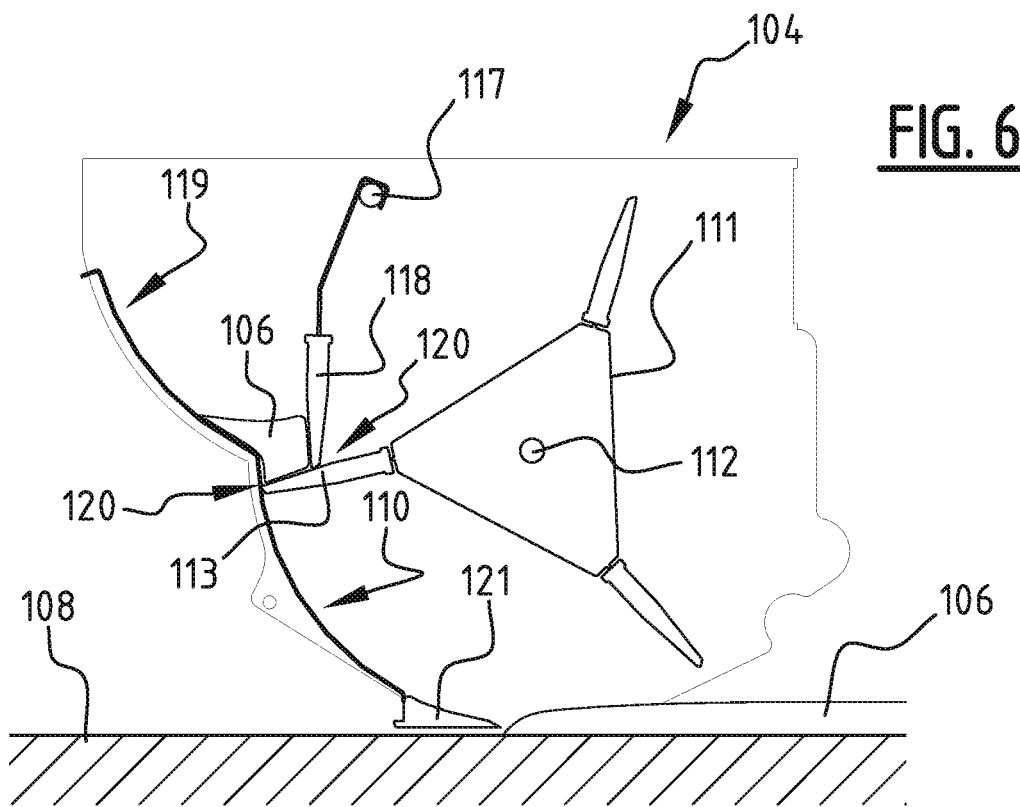
Figure 7:
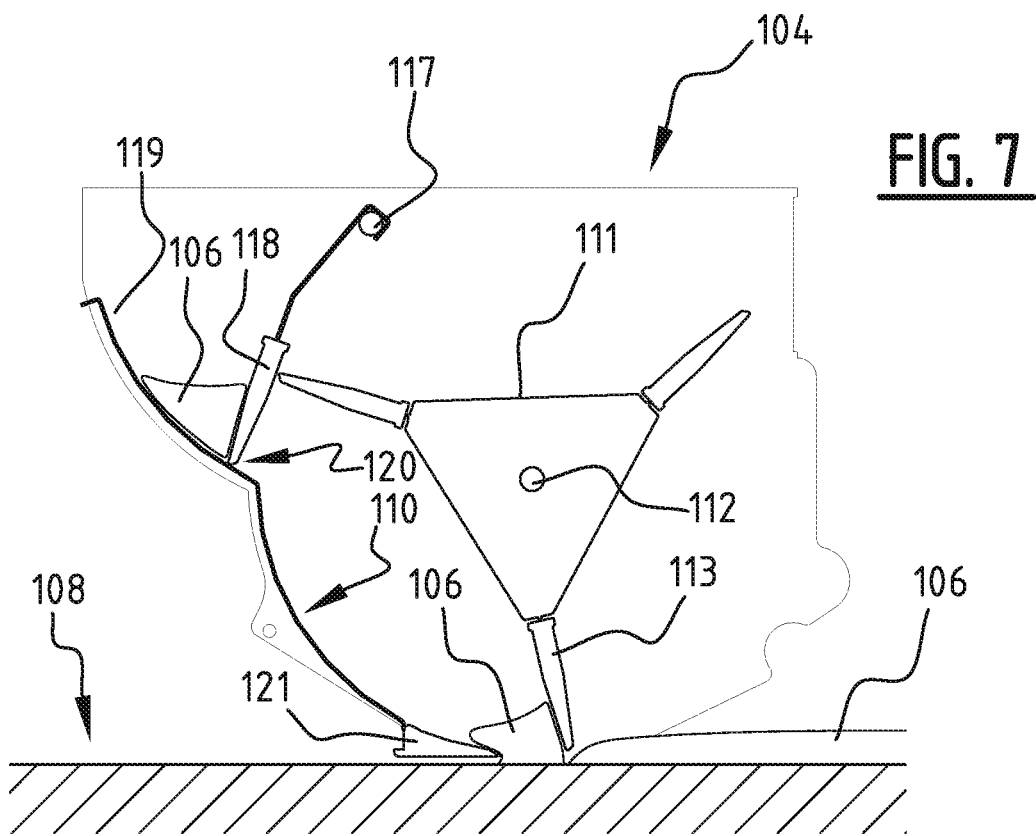

FIGS. 2-8 show a series of side views of the manure pick-up device 104 of the manure collecting device 103 of the animal accommodation cleaning device 100 of FIG. 1, wherein each of the FIGS. 2-8 show a stage of the process of picking up manure 106 with manure pick-up device 104 from the moment that the manure 106 is received through receiving opening 115 in housing 109 to the moment that the manure 106 is delivered through delivery opening 116 to reservoir 105. FIG. 2 shows manure pick-up device 104, the underside of which is situated close to the accommodation floor 108, in a stage immediately before manure 106 present on accommodation floor 108 comes into contact with guide element 121. FIG. 3 shows manure pick-up device 104, wherein manure 106 enters housing 109 through receiving opening 115 by means of the guide element 121 owing to forward movement of accommodation cleaning device 100, and is picked up by means of a rotation movement of the rotor arm 113 of rotatably movable body 111 situated closest to receiving opening 115 and carried further into housing 109. In FIG. 4 the picked-up manure 106 is transported upward along the cylindrically formed inner wall 110, wherein the pivotally movable scooping element 118 is situated outside the rotation movement area of rotor arm 113. In FIG. 5 the picked-up manure has been transported further upward and scooping element 118 is situated in the rotation movement area of rotor arm 113 and then scoops the upward transported manure from rotor arm 113. FIG. 6 shows a stage in which the picked-up manure 106 has already been scooped partially, but not yet wholly, from rotor arm 113, wherein scooping element 118 is still situated in the rotation movement area of rotor arm 113. In FIG. 7 the picked-up manure 106 has been scooped wholly from rotor arm 113, such that scooping element 118 is also no longer situated in the rotation movement area of rotor arm 113. Scooping element 118 then transports the manure scooped from rotor arm 113 toward delivery opening 116 via wall part 119, which functions as guide wall, in order to deliver this manure through delivery opening 116 to receptacle 105, i.e. the reservoir—see FIG. 8. Meanwhile, a subsequent rotor arm 113 has picked up manure 106 from accommodation floor 108, as shown in FIGS. 7 and 8, so as to transport this manure 106 to the reservoir 105 as according to the above-described method.

The present invention is not limited to the shown embodiments but also extends to other embodiments falling within the scope of protection of the appended claims.

The invention claimed is:

1. A manure collecting device, comprising:
   a manure pick-up device for picking up manure from a floor of an animal accommodation; and
   a reservoir for collecting therein, manure, picked up by the manure pick-up device, wherein the manure pick-up device comprises:

a housing, comprising:
- a receiving opening for the purpose of receiving manure in the housing therethrough,
- a delivery opening for the purpose of delivering the picked-up manure to the reservoir therethrough, and
- an at least partially cylindrical inner wall, wherein the inner wall extends at least between the receiving opening and the delivery opening; and a rotatably movable body with a central shaft and at least one arm extending radially relative to the shaft between the shaft and the inner wall, wherein the manure pick-up device is configured such that, while the body moves in rotating manner, the manure is picked up by means of the arm and is transported through the housing to the reservoir in co-action with the inner wall, wherein the manure collecting device further comprises:

a drive device which is configured to drive the rotatably movable body, such that the body rotates about its central shaft; and near the delivery opening, a scooping element configured to scoop away at least a part of a quantity of manure which has been picked up by the arm and is transported to the delivery opening on a side of the arm facing toward the delivery opening, and to guide said part of said quantity of manure through the delivery opening toward the reservoir, wherein the scooping element is driven by the drive device via a transmission device, such that the scooping element moves pivotally between a position in which the scooping element is situated in a rotation movement area of the arm and a position near the delivery opening, in which the scooping element is situated outside a rotation movement area of the arm, such that the scooping element scoops away the part of the quantity of manure transported by the arm and transports it to the delivery opening without the scooping element and the arm touching each other.

2. The manure collecting device according to claim 1, wherein the manure collecting device is configured to be advanced through the animal accommodation in a direction of movement and to pick up manure using the manure pick-up device while the manure collecting device advances through the animal accommodation, wherein the receiving opening is situated on a front side of the manure collecting device.

3. The manure collecting device according to claim 2, wherein the central shaft extends perpendicularly of the direction of movement, in a horizontal direction.

4. The manure collecting device according to claim 3, wherein the delivery opening is situated such that the manure is delivered to the reservoir on an upper side of the reservoir.

5. The manure collecting device according to claim 1, wherein at least an outer end of the arm is elastically deformable.

6. The manure collecting device according to claim 5, wherein the outer end of the arm is formed by a plate element manufactured from plastic.

7. The manure collecting device according to claim 5, wherein the arm has a length greater than a distance between the central shaft and the inner wall and/or a distance between the central shaft and the floor, such that the outer end of the arm drags over the floor and/or along the inner wall while the body moves in rotating manner.

8. The manure collecting device according to claim 1, wherein the at least one arm comprises three arms arranged at mutually equal angles.

9. The manure collecting device according to claim 1, further comprising at a transition between the receiving opening and the inner wall a guide element which extends toward the floor tangentially relative to the inner wall and which is configured to guide the manure present on the floor through the receiving opening into the housing while the manure collecting device advances.

10. An animal accommodation cleaning device, comprising:
- an advancing device for advancing the animal accommodation cleaning device through the animal accommodation in a direction of movement, and
- a manure collecting device according to claim 1 arranged substantially on a front side of the animal accommodation cleaning device.

11. The animal accommodation cleaning device according to claim 10, wherein the advancing device comprises an unmanned vehicle, preferably an autonomously moving vehicle.

* * * * *